July 27, 1926.                             1,594,116
F. E. RICKETTS
ELECTRICAL PROTECTIVE DEVICE
Filed August 15, 1919

WITNESSES:
H. J. Shelhamer
J. H. Procter

INVENTOR
Forrest E. Ricketts
BY
Wesley G. Carr
ATTORNEY

Patented July 27, 1926.

1,594,116

UNITED STATES PATENT OFFICE.

FORREST E. RICKETTS, OF CATONSVILLE, MARYLAND.

ELECTRICAL PROTECTIVE DEVICE.

Application filed August 15, 1919. Serial No. 317,651.

My invention relates to electrical protective devices and particularly to means for protecting parallel-connected transmission circuits.

One object of my invention is to provide effective means for selectively protecting parallel-connected conductors.

Another object of my invention is to provide a system of the above indicated character that shall require current-responsive relays only for controlling the protective devices.

A further object of my invention is to provide a suitable reverse relay that shall be adapted to turn in the one or the other direction only when the circuits to which it is connected become unbalanced.

In practicing my invention, I provide a series transformer for each conductor of a plurality of parallel-connected feeder conductors. With three or more feeder circuits to be protected, the transformers at the respective ends of two of the circuits are connected together by an auxiliary circuit. Time-limit overload relays are connected to the transformers of each circuit and are so set that the relays farthest from the generator are tripped in the shortest period of time. This time setting takes care of faults in the bus bars and in certain of the feeder circuits. A reverse relay is so connected to the auxiliary circuits that, when the currents traversing the two parallel-connected feeder circuits are unbalanced by reason of a fault therein, the relay selectively and instantaneously disconnects the faulty circuit. With this arrangement, relays responsive only to current are necessary and the expense incidental to supplying a plurality of potential transformers is obviated.

Figure 1:
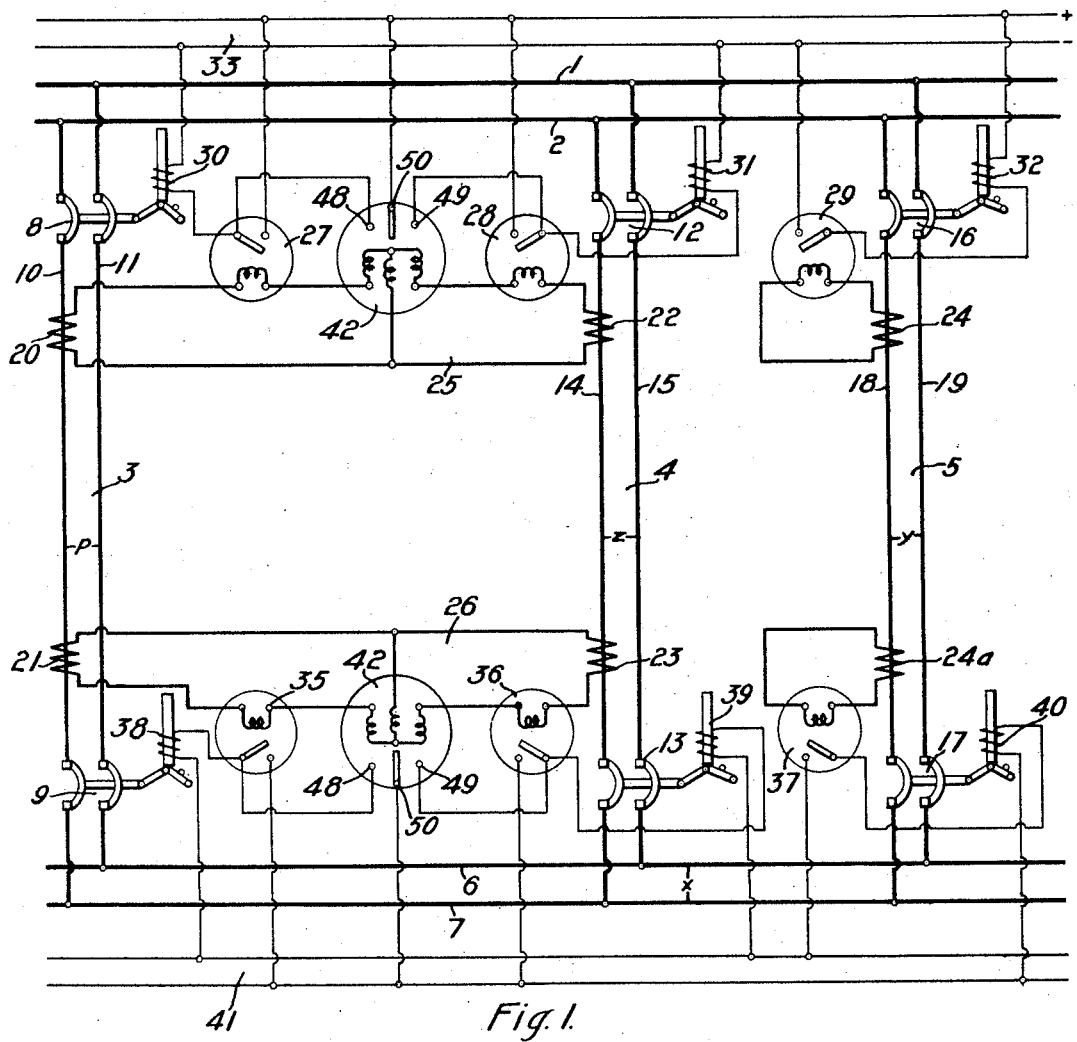
Figure 2:
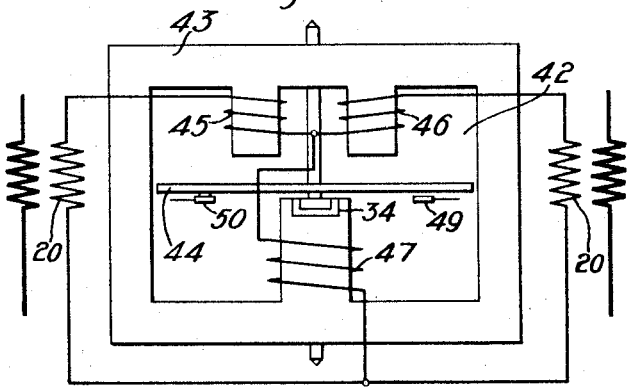

In the accompanying drawings, Figure 1 is a diagrammatic view of an electrical distributing system embodying my invention, and Fig. 2 is a diagrammatic view of a relay embodying my invention.

Generator bus bars 1 and 2 are connected through three parallel-connected feeder circuits 3, 4 and 5 to substation bus bars 6 and 7. Circuit interrupters 8 and 9 are connected in the conductors 10 and 11 of the circuit 3, at the respective ends thereof. Circuit interrupters 12 and 13 are connected in conductors 14 and 15 of the circuit 4 and, similarly, interrupters 16 and 17 are connected in circuit with conductors 18 and 19 of the circuit 5. Series transformers 20 and 21 are so disposed with respect to the circuit 3 as to have current induced therein that shall be proportional to the currents traversing the two ends of the circuit 3. Similarly, transformers 22, 23, 24 and 24a are connected to the respective ends of the circuits 4 and 5. The transformers 20 and 22 are connected by an auxiliary circuit 25, and the transformers 21 and 23 are similarly connected by an auxiliary circuit 26.

Time-limit overload relays 27, 28 and 29 are connected to the transformers 20, 22 and 24, respectively, for the purpose of controlling tripping magnets 30, 31 and 32 of the interrupters 8, 12 and 16, respectively. The relays 27, 28 and 29 are adapted to complete a circuit, through the respective tripping magnets 30, 31 and 32 from an auxiliary circuit 33.

Time-limit overload relays 35, 36 and 37 are operatively connected to the transformers 21, 23 and 24a respectively, for the purpose of controlling tripping magnets 38, 39 and 40 of the interrupters 9, 13 and 17, respectively. The tripping magnets 38, 39 and 40 are energized from an auxiliary circuit 41.

The time setting of the relays 27, 28 and 29, since they are adjacent the generator end of the circuits 3, 4 and 5, may be, for convenience, two seconds each. The relays 35, 36 and 37, since they are further removed from the generator, should be set at a less time interval and, for convenience, the relays 35 and 36 have one second time interval and the relay 37 has a half-second interval.

A reverse relay 42, comprising a magnetizable core member 43, a freely-rotatable armature 44, three main windings 45, 46 and 47 and a short-circuited winding 34, is connected to each of the circuits 25 and 26 for the purpose of operating instantaneously, upon an unbalance in the circuits 3 and 4, to selectively trip the interrupter in the faulty circuit. Windings 45 and 46 are connected in series with the circuits 25 and 26, and the winding 47 is connected across normally equi-potential points of the circuits 25 and 26. With this arrangement, the relay is inoperative so long as the same current traverses the circuits 3 and 4 and will turn in the one or the other direction, depending upon which circuit is faulty, only when the current in the circuits 3 and 4, and, consequently, in the windings 45 and 46, becomes so unbalanced as to produce a resultant magnetic flux that will co-operate with the flux produced by the winding 47 to operate the relay.

The relays 42 are provided with two stationary contact members 48 and 49 and a movable contact member 50 that are so connected to the contact members of the relays 27 and 28 and to the circuit 33 as to short circuit the contact members of these relays and to connect the tripping magnets 30 and 31 to the circuit 33. Similarly, the contact members of the relays 35 and 36 are so connected to the contact members of the relay 42 in the circuit 26, as to be short circuited and connected to the circuit 41, under predetermined conditions.

With the arrangement illustrated, if a fault obtains at the point $x$ on substation bus bars, the relay 37 will be operated in one-half second to disconnect the circuit 5 and one-half second later the relays 35 and 36 will operate to disconnect the circuits 3 and 4. If a fault obtains at the point $y$ in the circuit 5, the relay 37 will operate in one-half second to trip the interrupter 17 and the relay 29 will operate one and one-half seconds later to trip the interrupter 16; thus entirely disconnecting the circuit 5 from the system. Since the circuits 3 and 4 are intact and the current balanced, the relays therein will not operate under this condition.

If a fault obtains at the point $z$ in the circuit 4, the currents traversing the circuits 3 and 4 will be unbalanced and, before the relays 27 and 28 and 35 and 36 can operate by reason of their time settings, the relays 42 will cause the contact members 50 thereof to engage the contact members 49 and thus the tripping magnets 31 and 30 will be energized instantaneously to trip the interrupters 12 and 13. Similarly, if a fault obtains at the point $p$ in the circuit 3, the contact members 50 of the relays 42 will engage the stationary contact members 48 and thus effectively short circuit the contact members of the relays 27 and 35 to permit the tripping magnets 30 and 38 to trip the interrupters 8 and 9 instantaneously.

With my invention, a selective operation in the disconnection of parallel-connected feeder conductors is obtained without the use of potential coils or relays and, consequently, without the use of potential transformers. Three parallel-connected circuits are shown because this is usually considered to be the most difficult system to control in this manner, it being understood that, for even numbers of circuits, the balance arrangement shown as connected to the circuits 3 and 4, is all that is necessary.

The relay 42 is preferably constructed similarly to ordinary induction relays, with the exception that the winding 47 is connected to a point between the series-connected windings 45 and 46, and a short-circuited winding 34 is provided for effecting a shifting in the phase relation of the flux induced by the current traversing the windings 45, 46 and 47. Under normal conditions in the circuits 25 and 26, the armature does not move, but, when the currents traversing the circuits 3 and 4 become unbalanced, a traveling magnetic field is produced and the armature will turn in the one or the other direction in accordance with the energization of the windings 45 and 46.

My invention is not limited to the specific arrangement illustrated, as it may be variously modified without departing from the spirit and scope of the invention, as set forth in the appended claims.

I claim as my invention:

1. In a system of distribution, the combination with two parallel connected feeder conductors, a series transformer for each conductor and an overload relay connected to each of said transformers for controlling the disconnection of the corresponding conductor upon the occurrence of a predetermined overload, of a normally balanced current relay connected to both of said transformers to be energized in accordance with the values of the currents traversing the conductors for controlling the disconnection of only a conductor upon which a fault occurs.

2. In a system of distribution, the combination with two parallel connected feeder conductors, a series transformer for each conductor and an overload relay connected to each of said transformers for controlling the disconnection of the corresponding conductor upon the occurrence of a predetermined overload, of a single current relay energized from both circuits for selectively controlling the disconnection of only the faulty conductor.

3. In a system of distribution, the combination with a plurality of parallel-connected feeder conductors, circuit interrupters therefor, and a series transformer for each conductor, of an auxiliary circuit for operatively connecting the corresponding transformers of the conductors together, time-limit overload relays connected to the transformers for controlling the respective interrupters in accordance with the current in the associated circuits, and a relay connected only to the auxiliary circuit for instantaneously actuating only one of the interrupters under predetermined conditions of balance between said currents.

4. In a system of distribution, the combination with a plurality of parallel-connected feeder conductors, circuit interrupters therefor, and a series transformer for each conductor, of an auxiliary circuit for operatively connecting the corresponding transformers of the conductors together, time-limit overload relays connected to the transformers for controlling the respective interrupters in accordance with the currents in the associated circuits, and a relay connected to the auxiliary circuit and energized therefrom only for instantaneously actuating the interrupters of the conductors that are connected together by the auxiliary circuit under predetermined conditions involving the value of the respective currents relative to each other.

5. In a system of distribution, the combination with a plurality of parallel-connected feeder conductors, circuit interrupters therefor, and a series transformer for each conductor, of an auxiliary circuit for connecting the transformers together, a time-limit overload relay for each transformer, and means connected to the auxiliary circuit only for selectively rendering the time-limit relay of a conductor ineffective when a fault obtains therein causing a variation from a predetermined balance between the circuit currents, and for instantaneously causing the interrupter to disconnect the faulty conductor.

6. In a protective system the combination of two sources of energy and an induction relay comprising a plurality of magnetically coacting members having windings thereon respectively energized from both said sources and means cooperating with said members to set up travelling magnetic fields in a direction determined by the relative values of said sources.

7. The combination with two parallel transmission circuits and circuit-interrupters therein, of a directional induction relay for selectively controlling said interrupters comprising two magnetically coacting members respectively energized in accordance with the currents flowing in said circuits and means cooperating with said members to set up a travelling magnetic field whose direction is determined by the relative values of the currents in said circuits.

8. The combination with two sources of power, of an induction relay comprising a disc armature, and a plurality of windings for actuating the same, the windings being so arranged and connected that a plurality of fluxes intercept the armature, one of which is proportional to the sum of the two sources of power and the other to another function thereof.

9. The combination with two sources of power, of an induction relay having windings respectively energized from said two sources of power and means cooperating with said windings to set up travelling magnetic fields in a direction determined by the relative values of said sources.

10. The combination with two sources of power, of an induction relay having a magnetizable core member so energized from said sources as to produce a traveling magnetic field, the direction of which depends upon which of said sources exerts the greater effect.

11. The combination with two sources of power, of an induction relay comprising a movable member and electromagnetic means connected to said sources for producing out-of-phase magnetic fluxes traversing said member, said means being so proportioned that said member is actuated in a predetermined direction when one of said sources exerts a greater effect than the other.

12. The combination with two sources of power, of an induction relay comprising a movable member and actuating windings therefor connected in series and in shunt with said sources, said windings being so proportioned that said member is actuated in a predetermined direction when said sources become unbalanced.

In testimony whereof, I have hereunto subscribed my name this first day of August 1919.

FORREST E. RICKETTS.